United States Patent Office 3,755,365
Patented Aug. 28, 1973

3,755,365
HETEROBICYCLIC COMPOUNDS AND PROCESS
FOR THEIR PREPARATION
Allison F. Fentiman, Jr., Columbus, Ohio, and Jean P. Vité, Beaumont, Tex., assignors to Boyce Thompson Institute for Plant Research, Inc.
No Drawing. Filed Aug. 12, 1969, Ser. No. 849,494
Int. Cl. C07d 13/04
U.S. Cl. 260—340.9                                       2 Claims

ABSTRACT OF THE DISCLOSURE

New biologically active oxygen-containing heterobicyclic compounds and a method for their preparation. The compounds disclosed herein are substituted 6,8-dioxabicyclo[3.2.1]octanes wherein the 5 position carbon is substituted with a lower alkyl and the 1 and 7 position carbons are substituted with a member of the group consisting of hydrogen and lower alkyl radicals. A simple, one-step process for synthesizing these compounds comprising reacting a lower alkyl vinyl ketone with an allyl alcohol is disclosed.

BACKGROUND OF THE INVENTION

(1) Field of the invention

This invention relates to new chemical compounds and to a process for their preparation. More particularly, the present invention relates to certain oxygen-containing heterobicyclic compounds and to a process for their preparation.

The compounds to which the present invention relates have the following general formula:

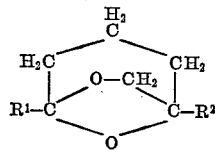

wherein $R^1$ is a member of the group consisting of lower alkyl radicals and $R^2$ is a member of the group consisting of hydrogen and lower alkyl radicals.

Under the nomenclature set forth in "The Ring Index. Ring Systems Used in Organic Chemistry," by Patterson and Capell, Reinhold Publishing Company, 1940, this class of compounds may be referred to as 1,5-disubstituted-6,8-dioxabicyclo[3.2.1]octane, in which the substituents are hydrogen or lower alkyl groups such as methyl, ethyl, n-propyl, etc. According to another nomenclature, however, these compounds may be called generically 2,6-disubstituted-2,6-epoxymethanotetrahydropyrans, in which the substituents are hydrogen or lower alkyl groups such as methyl, ethyl, n-propyl, etc.

If one opts for this latter system, the several positions around the bicyclic ring should be designated as follows:

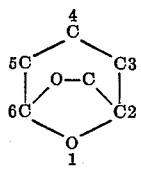

If, however, one is inclined to call the compounds of this invention 1,5-disubstituted - 6,8 - dioxabicyclo[3.2.1]octanes then the numerical designations should be arranged this way:

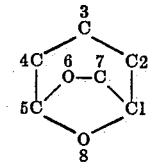

The preference in the present specification, incidentally, will be for the 6,8-dioxabicyclo[3.2.1]octane description.

(2) Description of the prior art

Some 6,8-dioxabicyclo[3.2.1]octanes have already been described by workers in the art. One group of these compounds can be shown by the following structural formula:

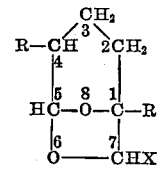

wherein R may be either hydrogen or a methyl group and X may be either hydrogen, an alkyloxy group or an acyloxy group.

A second class of compounds which has been described in the prior art can be depicted structurally in this manner:

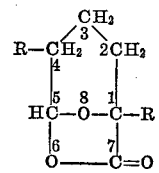

wherein R may be either hydrogen or a methyl group.

Still another group of these 6,8-dioxabicyclo[3.2.1]octanes, called heterobicyclic nitriles by their discoverer, may be represented by this general formula:

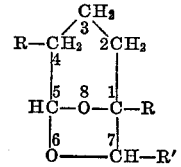

wherein R is a member selected from the class consisting of hydrogen and methyl radicals and R' is a member selected from the class consisting of cyano, aminomethyl, carboxy and carbalkoxy radicals.

In the past, heterobicyclic compounds similar to those claimed herein have been prepared using derivatives of the relatively complex heterocycle sometimes called pyran. Pyran may be represented by the following structural formula:

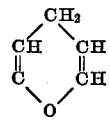

Thus, typical starting materials used by prior art practitioners to prepare compounds similar to the type of the invention have been derivatives of 3,4-dihydro-1,2-pyran having a carboxyl group or a methanol group attached to the carbon atom in the 2-position of the dihydropyran ring. Likewise, other methods of preparing heterobicyclic compounds similar to those claimed herein have involved the reaction of hydrogen cyanide with acrolein dimer (2,3-dihydro-2-formyl-1,4-pyran) of methacrolein dimer (2,3-dihydro-2,5-dimethyl-2-formyl-1,4-pyran).

SUMMARY OF THE INVENTION

This invention provides for novel oxygen-containing heterobicyclic compounds having the following formula:

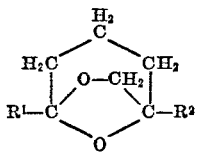

wherein $R^1$ is a member of the group consisting of lower alkyl radicals and $R^2$ is a member of the group consisting of hydrogen and lower alkyl radicals. These compounds may be referred to as 1,5-disubstituted-6,8-dioxabicyclo [3.2.1]octanes.

In particular, this invention relates to the chemical compound which may be represented structurally as follows:

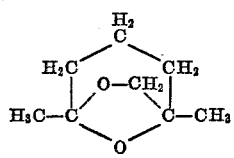

This compound may be referred to as 1,5-dimethyl-6,8-dioxabicyclo[3.2.1]octane.

Quite unexpectedly, it has been found that, by attaching lower alkyl radicals to the 1 and 5 positions of the basic heterobicyclic unit, one can create some of the most potent physiologically active substances known to non-mammalian biochemistry, a singular characteristic which manifestly sets them apart from the above-enumerated prior art compounds.

This invention also provides a simple, one-step process for synthesizing the claimed compounds, their homologs and anologs not claimed herein, but likewise physiologically potent, comprising the reaction of a lower alkyl vinyl ketone with a compound having the following general formula:

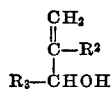

wherein $R^2$ and $R^3$ represent members of the group consisting of hydrogen and lower alkyl radicals. Preferably, the employed lower alkyl vinyl ketone is methyl vinyl ketone (Chemical Abstracts name: 1-buten-3-one). The other compound, an allyl alcohol, is preferably methallyl alcohol (Chemical Abstracts name: 2-methyl-2-propen-1-ol). The overall reaction by which the present compounds and other homologous and analogous compounds not claimed herein may be prepared is thought to correspond to the following equation:

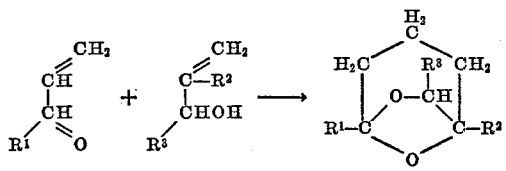

wherein $R^1$, $R^2$ and $R^3$ represent members of the group consisting of hydrogen and lower alkyl radicals.

When $R^1$ and $R^2$ are methyl radicals and $R^3$ is hydrogen, the resultant product is 1,5-dimethyl-6,8-dioxabicyclo [3.2.1]octane, called "frontalin" for convenience. Likewise, when $R^1$ is a methyl radical, $R^2$ is a hydrogen atom and $R^3$ is an ethyl radical, there is recovered the compound 5-methyl-7-ethyl-6,8-dioxabicyclo[3.2.1]octane, the exo-isomer of which is a pheromone of the western pine beetle *Dendroctonus brevicomis*, assigned the trivial name "brevicomin." Thus, the starting materials for this latter reaction are methyl vinyl ketone and 1-penten-3-ol.

DESCRIPTION OF THE PREFERRED EMBODIMENTS

The preferred way to practice the invention is to pass a mixture of methyl vinyl ketone and methallyl alcohol in an inert solvent through a heated tubular reactor and distill the product to separate the frontalin which forms. A preferred temperature range is 230°–270° centigrade, although the invention is workable in the range of 150°–320° centigrade. Reaction times ranging from 2 to 40 minutes are conveniently employed, but, as is well-known, the rate of a chemical reaction increases with the temperature so that one can readily determine by a few experiments the residence time needed at a selected temperature.

Methyl vinyl ketone and methallyl alcohol combine in a 1:1 mole ratio to form frontalin, but, because of methyl vinyl ketone's proclivity to undergo other reactions, the use of an excess of alcohol is recommended in order to insure a relatively high yield of frontalin from methyl vinyl ketone. The unreacted methallyl alcohol can be separated from the reaction product and recycled to the process. We prefer to use methallyl alcohol to methyl vinyl ketone mole ratios between 2:1 and 4:1. The use of smaller or larger ratios, however, are also contemplated by the invention.

Superior results are obtained if this reaction is conducted in the liquid phase and therefore it is desirable to control the pressure so that the reactants retain their fluidity. Thus, the pressure required will vary with other reaction conditions, especially temperature. Generally, however, pressures within the range of 100–1000 p.s.i.g. will prove to be satisfactory.

It is within the scope of the invention to carry out the reaction without a solvent. Nevertheless, both yield and efficiency are improved by the use of an inert solvent. Suitable inert solvents include benzene, toluene, hexane, heptane, tetrahydrofuran, diisopropyl ether, ethyl acetate and other solvents inert to the system. Prudence dictates choosing a solvent with a boiling point substantially different from that of frontalin.

The following examples will illustrate certain specific embodiments of the process by which the compounds of the invention and related compounds may be prepared. It will be understood that the examples are presented for the purpose of illustration only, and not to limit the invention as it is more broadly described herein and defined in the appended claims.

EXAMPLE I

Methyl vinyl ketone (70 grams, 1.0 mole), methyallyl alcohol (216 grams, 3.0 moles) and hydroquinone (100 grams) were charged to a glass-lined rocker autoclave and heated to 200° centigrade for two hours. The resultant mixture was cooled, collected and distilled at reduced pressure. It yielded 4 grams of frontalin which boiled at between 71° and 72° centigrade under 26 millimeters mercury pressure and had a refractive index ($n_D^{26}$) of 1.4352. In this experiment, the product prepared was found to contain 67.64 percent carbon and 9.92 percent hydrogen, compared to the values of 67.60 percent carbon and 9.85 percent hydrogen calculated for the formula $C_8H_{14}O_2$. In other fractions, there was an additional 16 grams of frontalin so that the total yield was 22 grams of frontalin (0.15 mole), 15 percent based on methyl vinyl ketone. The designated structure was further confirmed by infrared and NMR spectra.

EXAMPLE II

Methyl vinyl ketone (70 grams, 1.0 mole), methallyl alcohol (216 grams, 3.0 moles), and toluene (276 grams) were charged to a one-liter stainless steel rocker autoclave and heated to 250° centigrade over a 1.5 hour period at a pressure of 350 p.s.i.g. The mixture was maintained at 250° for two hours, cooled, collected and distilled at reduced pressure. A 52-gram fraction of frontalin and a 31-gram fraction of 33 percent frontalin were obtained. Hence, the yield was 62 grams (0.62 mole) or 43.6 percent based on methyl vinyl ketone. 52 grams of a high-boiling residue were also collected.

EXAMPLE III

Methyl vinyl ketone (23 grams), methallyl alcohol (72 grams), and benzene (165 grams) were charged to a one-liter rocker autoclave and heated to 150° centigrade. The reaction mixture was maintained at 146°–156° centigrade for two hours, cooled, collected and analyzed by vapor chromatography. On a benzene-free basis, 3.3 percent of the reaction mixture was frontalin.

EXAMPLE IV

A mixture of 16.0 percent by weight of methyl vinyl ketone and 46.3 percent of methallyl alcohol dissolved in 37.7 percent of toluene was pumped through a coiled tubular reactor with a ¼-inch diameter and a 100-milliliter volume immersed in an oil bath heated to 262° centigrade. To keep the reactants liquid, the pressure inside the reaction system was maintained at 800 p.s.i.g. The feed rate was 150 milliters per hour resulting in a reaction time of approximately 40 minutes. The mole ratio of methallyl alcohol to methyl vinyl ketone in the feed was 2.8:1, and the mole ratio of toluene to methyl vinyl ketone was 1.8:1.

After reaction conditions were stabilized, a 290-gram portion of the product was collected and analyzed by a combination of distillative and vapor chromatographic techniques. It was found to contain, in addition to 37.7 percent toluene, 17.2 percent frontalin, 31.3 percent unreacted methallyl alcohol and 13.8 percent other substances, including a high-boiling residue. The reaction consumed all of the methyl vinyl ketone.

Computations using the above data indicated that the yield of frontalin based on methyl vinyl ketone was 53.3 percent and the efficiency based on methallyl alcohol was 58.3 percent.

The compounds of the invention, particularly 1,5-dimethyl - 6,8 - dioxabicyclo[3.2.1]octane, are valuable in the attraction and aggregation of Dendroctonus beetles. Although the compounds of the invention have a limited attractive power when used alone, the response of insects to them is greatly enhanced by adding a terpene, such as is found in oleoresin tapped from a host tree of such insects, and also trans-verbenol. In this combination, 1,5-dimethyl - 6,8 - dioxabicyclo[3.2.1]octane, as well as the other compounds of the invention, are highly competitive with natural sources of attractants in luring populations of Dendroctonus beetles. Crushed emergent beetles represent a relatively strong source of natural attractant.

TABLE I

Field response during 10-min. periods of *D. frontalis* to olfactometers set 10 M apart

| Test material | No. of beetles responding (10-min. test periods) after— | | | | | Sex ratio (male: female) |
| --- | --- | --- | --- | --- | --- | --- |
| | 1 test | 2 tests | 3 tests | Total | Average | |
| Frontalin | 0 | 1 | 2 | 3 | 1 | |
| Frontalin, transverbenol and oleoresin | 7 | 17 | 8 | 32 | 10.7 | 1:0.3 |
| Crushed *D. frontalis* (2,500 male and female) and oleoresin | 7 | 4 | 2 | 13 | 4.3 | 1:2.3 |
| Oleoresin | 0 | 0 | 0 | 0 | 0 | |
| Frontalin and oleoresin | 6 | 17 | 9 | 32 | 10.7 | 1:0.4 |
| Crushed *D. frontalis* (2,500 male and female) and oleoresin | 3 | 19 | 12 | 34 | 11.3 | 1:1.8 |
| Oleoresin and trans-verbenol | 0 | 0 | 0 | 0 | 0 | |

What is claimed is:

1. A method of preparing the compounds having the structures defined by the formula:

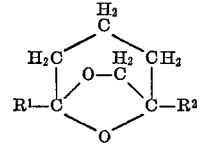

which comprises treating at a temperature between 150° and 320° C. a lower alkyl vinyl ketone having a structure defined by the formula:

with a compound having the structure defined by the formula:

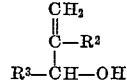

wherein $R^1$ is methyl, $R^2$ is selected from the group consisting of hydrogen and methyl and $R^3$ is selected from the group consisting of hydrogen and $C_1$–$C_2$ alkyl and wherein when $R^3$ is hydrogen, $R^2$ is methyl and when $R^2$ is hydrogen, $R^3$ is $C_1$–$C_2$ alkyl.

2. The method of producing the compound of claim 1 wherein $R^1$ and $R^2$ of said compound are methyl and $R^3$ is hydrogen which comprises treating at a temperature between 150° and 350° centigrade methyl vinyl ketone with an excess of methallyl alcohol.

References Cited

Kinzer et al., "Nature," vol. 221, 1969, pp. 477–78.
Silverstein et al., "Science," vol. 159, 1968, pp. 889–91.
Stoner et al., "Journal American Chemical Society, vol. 72 (1950), pp. 1531–1533.

ALEX MAZEL, Primary Examiner

J. H. TURNIPSEED, Assistant Examiner

U.S. Cl. X.R.

424—84, 278

UNITED STATES PATENT OFFICE
CERTIFICATE OF CORRECTION

Patent No. 3,755,365　　　　　　　　Dated August 28, 1973

Inventor(s) Allison F. Fentiman, Jr., and Jean P. Vite

It is certified that error appears in the above-identified patent and that said Letters Patent are hereby corrected as shown below:

Column 2, lines 58 to 63, delete the formula:

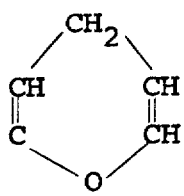　　　　　and insert　　--　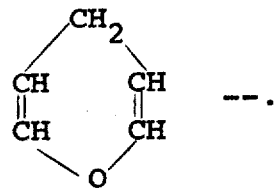　--.

Column 3, line 5, delete "of" and insert --or--.

Column 3, lines 60-68, delete the formula:

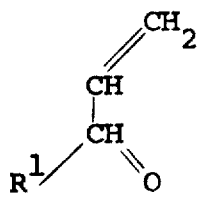　　　　　and insert　　--　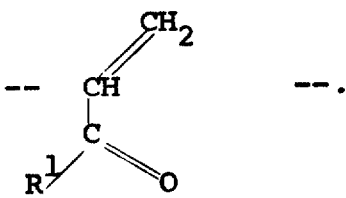　--.

Signed and sealed this 12th day of February 1974.

(SEAL)
Attest:

EDWARD M. FLETCHER, JR.　　　　　　C. MARSHALL DANN
Attesting Officer　　　　　　　　　Commissioner of Patents